United States Patent Office 3,242,106
Patented Mar. 22, 1966

3,242,106
PRODUCTION OF ION-SELECTIVE MEMBRANES
FROM AQUEOUS EMULSIONS OF POLYMERS
Theodore Roger Ernest Kressman, Watford, England, assignor to The Permutit Company Limited
No Drawing. Filed Aug. 3, 1961, Ser. No. 128,951
Claims priority, application Great Britain, Aug. 10, 1960,
27,725/60
10 Claims. (Cl. 260—2.1)

This invention relates to the production of membranes having ion-selective properties.

An object of the invention is to produce a membrane in a particularly simple manner from readily available starting materials.

Another object of the invention is to produce a very thin membrane in a new way.

Broadly my invention comprises forming a membrane from an aqueous emulsion in which the dispersed phase is a mixture of polymers and subsequently introducing ion-selective groups into the membrane. One of the polymers in the mixture must be of the kind into which ion-selective groups can be introduced and at least one other must be a thermoplastic polymer or copolymer.

Examples of the polymers into which ion-selective groups can be introduced and which can be used are polystyrene, polyacenaphthylene, poly(methylstyrene), poly(chlorostyrene), poly(styrene-butadiene) and poly-(styreneacrylic ester).

The thermoplastic component may, for example, be one or more of the following, namely a copolymer of butadiene and acrylonitrile, a copolymer of vinylidene chloride and acrylonitrile, a copolymer of vinylidene chloride and an acrylic ester, a copolymer of vinyl chloride and vinylidene chloride, chlorosulphonated polyethylene, a copolymer of butadiene and methyl methacrylate, mixed polymers of polyvinyl chloride and chlorinated polyethylene and polyvinyl chloride.

Aqueous emulsions of these component polymers and copolymers are commonly called latices. Most of them are readily available on the market, and they can all be readily made. If desired, the latex can be thickened by the use of a thickening agent. Suitable agents are caseinates, methyl cellulose, carboxymethyl cellulose, alginates, and polyacrylates.

To produce a membrane from the emulsions it is only necessary to mix them together and allow the water to evaporate. The membranes produced can be much thinner than those made by some of the standard methods hitherto. Membranes made by these methods are about 30 thousandths of an inch thick, but membranes according to the invention can be from 5 to 10 thousandths of an inch thick. Since, say, 240 membranes are normally used in an electrodialytic cell, this saving in material is a substantial advantage.

Instead of mixing two emulsions together to produce the emulsion that is formed into a membrane, one component can be added in the form of its monomer to an aqueous emulsion of the other component or components, and then polymerised in the mixture (for example, under the influence of a persulphate), the water being subsequently evaporated to leave the desired membrane. The monomer may be or may include a cross-linking agent, e.g. divinyl benzene, as this increases the toughness and stability of the membrane.

To increase the strength of the membrane, reinforcement may advantageously be used, the membrane being formed as a film on a woven material or mesh. Naturally the reinforcement should be resistant to the treatment by which ion-selective groups are introduced into the membrane. Polyethylene terephthalate, polyvinylchloride, polyethylene and polyacrylonitrile are examples of suitable materials, and glass cloth is particularly suitable because of its resistance to attack.

In making a reinforced membrane, conventional methods of dripping, either batchwise or continuously, casting and multicoating can be employed.

It may also be desirable to include a small proportion of polyethylene of low molecular weight in the membrane, since this reduces a tendency to brittleness in some membranes. A suitable proportion is about 5% by weight.

The membrane may be pressed or calendered, if desired, either after or preferably before the introduction of the ion-exchange groups.

The selection of the components of the emulsion for making any given membrane depends upon the nature of the treatment by which the ion-selective properties are introduced. When these properties are anion-selective, the preferred membrane consists of 30% polystyrene and 70% of a copolymer of butadiene and acrylonitrile. However less or more polystyrene can be used. As the proportion of polystyrene is reduced the electrical resistance progressively increases, while as it is increased the finished membrane becomes progressively weaker. At least 50% of the copolymer is required to make a commercially useful membrane.

The anion-selective properties may be imparted by first chloromethylating and then aminating the membrane. Either aluminium chloride or stannic chloride can be used as the chloromethylating catalyst, but aluminium chloride is preferred as it gives tougher, less brittle materials than stannic chloride. The selectivity increases with increasing concentration of aluminium chloride in the chloromethyl ether, but there is no advantage in increasing the concentration above 20%. The chloromethylation is preferably carried out at 20° C. Higher temperatures tend to produce somewhat weaker membranes and when a reinforcing material is used this tends to be attacked, unless it is glass cloth. At the optimum conditions, chloromethylation generally takes about 2 hours. Nothing is gained or lost in continuing it for a longer period.

Two examples of the production of a membrane with anion-selective properties will now be given.

*Example 1*

100 grams of an emulsion of a copolymer of butadiene and acrylonitrile (sold under the trademark Hycar 1551) were mixed with 45 grams of an emulsion of polystyrene (sold under the trademark Lustrex 45A). The mixture was poured onto a level glass plate and the water was allowed to evaporate at room temperature. The membrane formed was continuous and homogeneous and 0.33 mm. thick. It contained 30% of polystyrene by weight.

This membrane was then chloromethylated and aminated to introduce anion-selective groups. The chloromethylation was carried out by immersing the film for 16 hours at room temperature in a bath of chloromethyl ether containing 4% of anhydrous aluminium chloride. After washing with water the chloromethylated film was immersed at room temperature for 16 hours in an aqueous 30% trimethylamine solution. In was then rinsed in water, dilute hydrochloric acid and finally water again.

The electrical resistance of the membrane was 12 ohm/cm.$^2$ across the faces, and it had a transport number measured in 0.1 N–0.2 N NaCl of 0.97.

*Example 2*

2.9 parts of a polystyrene latex (sold under the trademark Lustrex 45A), 5 parts butadiene-acrylonitrile latex (sold under the trademark Hycar 1551) and 1 part of a polyethylene emulsion (the polyethylene having the low molecular weight of 200) were mixed, cast onto a horizontal glass plate and dried to give a film containing 30% polystyrene and 5% polyethylene.

The film was immersed in a solution of 16% aluminium chloride in chloromethyl ether for 3 hours at room temperature and then washed in water. It was next immersed in aqueous trimethylamine solution (25–30%) for 16 hours at room temperature. Finally it was washed in 5% HCl and then in water.

The membrane so produced had a resistance of 8.6 ohms per cm.$^2$ in 0.1 N NaCl at 25° C. and a transport number between 0.1 N and 0.2 N NaCl of 0.93.

In the production of membranes with anion-selective properties, polyvinyl chloride is not normally a suitable polymer, since strongly basic groups such as quaternary ammonium groups cannot be introduced into it, and the weakly basic amine groups which can be introduced into it are not normally required in a membrane.

When the membranes are to be cation-selective it is preferred to use polyvinyl chloride or a copolymer of vinylidene chloride and an acrylic ester as the thermoplastic polymer. Sulphonic groups can readily be introduced into these. For reinforcing such membranes, glass fabric should be used, since sulphuric acid used for introducing sulphonic groups attacks woven plastics.

Three examples of the production of cation-selective membranes will now be given.

*Example 3*

1 part of a butadiene-acrylonitrile latex (sold under the trademark Hycar 1551) and 3.2 parts of a polyvinyl chloride latex (sold under the trademark Corvic HL 65/55/01) were mixed together and used to coat a glass fabric about 5 thousandths of an inch thick by a dipping technique. The coating was dried at 80° C. and fused for 5 minutes at 160° C. to give a product about 8 thousandths of an inch thick that contained 23% butadiene-acrylonitrile.

The product was immersed in 98% sulphuric acid for 2 hours at room temperature and then finally washed with water. The resultant membrane was converted to the sodium form by heating in 2 N sodium hydroxide at 70° C. for half an hour. It had a resistance of 13.3 ohm cm.$^2$ in 0.1 N NaCl at 25° C. and a transport number between 0.1 N and 0.2 N NaCl of 0.91.

*Example 4*

1 part of a styrene-butadiene latex (sold under the trademark Monsanto SB1) and 1.2 parts of a polyvinyl chloride latex (sold under the trademark Corvic 65/55/01) were mixed and the mixture used to coat the same glass fabric as in Example 3. The coating was dried at 80° C. and fused at 160° C. for 5 minutes to give a product about 8 thousandths of an inch thick containing 43% styrene-butadiene copolymer.

The product was treated with 98% sulphuric acid at room temperature for 1 hour and then washed with water. The membrane was converted to the sodium form by heating it in 2N sodium hydroxide at 70° C. for half an hour. This membrane had a resistance of 2.6 ohms cm.$^2$ in 0.1 N NaCl at 25° C. and a transport number between 0.1 N and 0.2 N NaCl of 0.91.

*Example 5*

1 part of polystyrene latex (sold under the trademark Lustrex 45A) and 7.5 parts of a dispersion of a copolymer of vinylidene chloride and acrylic ester (sold under the trademark Texicryl DP/901VC) were mixed and used to coat a glass fabric in exactly the same way as in Example 3. The membrane was sulphonated, exactly as in Example 3, to give a product with a resistance of 28 ohms per cm.$^2$ in 0.1 N NaCl at 25° C. and a transport number in 0.1 N–0.2 N NaCl of 0.95.

I claim:
1. A method of producing a membrane having ion-selective properties comprising forming into a membrane an aqueous emulsion in which the dispersed phase is a mixture of a first member which is a polymer into which ion-selective groups can be introduced and at least one member selected from the group consisting of thermoplastic polymers and copolymers incapable of taking up ion-selective groups, and subsequently introducing ion-selective groups into the membrane by chemical reaction with the first member.

2. A method according to claim 1 in which a small proportion of polystyrene of low molecular weight is included in the mixture.

3. A method according to claim 1 in which the membrane is formed on reinforcement.

4. A method according to claim 3 in which the reinforcement is glass cloth.

5. A method according to claim 1 for the production of an anion-selective membrane in which the emulsion consists of polystyrene and a copolymer of butadiene and acrylonitrile.

6. A method according to claim 1 for the production of a cation-selective membrane in which the thermoplastic polymer is selected from the group consisting of polyvinyl chloride and copolymers of vinylidene chloride and an acrylic ester.

7. A method according to claim 1 in which the emulsion is formed by mixing an aqueous emulsion of at least one component with a monomer of another component and polymerising the monomer in the mixture.

8. A method according to claim 7 in which a cross-linking agent for the monomer is added to the mixture before the polymerisation.

9. A method of producing a membrane having ion-selective properties comprising mixing together an aqueous emulsion of a first member which is a polymer into which ion-exchange groups can be introduced and an aqueous emulsion of at least one member selected from the group consisting of thermoplastic polymers and copolymers incapable of taking up ion-selective groups, forming the resultant mixture into a membrane, and subsequently introducing ion-selective groups into the membrane by chemical reaction with the first member.

10. A method of producing a membrane having ion-selective properties comprising mixing together an aqueous emulsion of a first member selected from the group consisting of polystyrene, polyacenaphthylene, poly(methylstyrene), poly(chlorostyrene), poly(styrene-butadiene) and poly(styrene-acrylic ester) and an aqueous emulsion of a second member selected from the group consisting of a copolymer of butadiene and acrylonitrile, a copolymer of vinylidene chloride and acrylonitrile, a copolymer of vinylidene chloride and an acrylic ester, a copolymer of vinyl chloride and vinylidene chloride, chlorosulphonated polyethylene, a copolymer of butadiene and methyl methacrylate, mixed polymers of polyvinyl chloride and chlorinated polyethylene, and polyvinyl chloride, forming the resultant mixture into a membrane, and subsequently introducing ion-selective groups into the membrane by chemical reaction with the first member.

References Cited by the Examiner

UNITED STATES PATENTS

| | | | |
|---|---|---|---|
| 2,636,851 | 4/1953 | Juda | 260—2.1 |
| 2,681,320 | 6/1954 | Bodamer | 260—2.2 |
| 2,957,206 | 10/1960 | Mindick | 260—2.1 |
| 3,004,904 | 10/1961 | Gregor | 260—2.2 |
| 3,133,889 | 5/1964 | Hazenberg et al. | 260—2.1 |

WILLIAM H. SHORT, *Primary Examiner.*

HAROLD N. BURSTEIN, *Examiner.*

J. C. MARTIN, C. A. WENDEL, *Assistant Examiners.*